United States Patent Office 3,183,231
Patented May 11, 1965

3,183,231
CYANONAPHTHOXAZOLE BRIGHTENERS
Bennett George Buell, Somerville, N.J., assignor to American Cyanamid Company, Stamford, Conn., a corporation of Maine
No Drawing. Filed July 17, 1963, Ser. No. 295,831
7 Claims. (Cl. 260—249.5)

This invention relates to the provision of 2-(triazinylaminophenyl)-5-cyanonaphth[1,2-d]oxazoles, to a new process for preparing said compounds, and to intermediate compounds encountered in said new process. The 2-(triazinylaminophenyl)-5-cyanonaphth[1,2-d]oxazoles (hereinafter sometimes referred to as "cyanonaphthoxazoles") are useful as optical bleaching agents or brighteners on polymeric substrates.

More specifically, this invention relates to the provision of final products of the following formula:

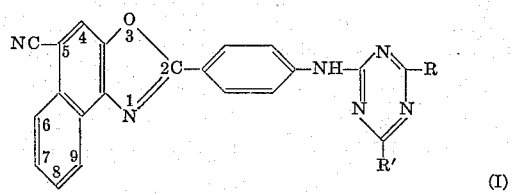

wherein R and R' are individually either lower alkoxy, lower alkylmercapto, allyloxy, allylmercapto, phenoxy, phenylmercapto, lower hydroxyalkoxy, lower dihydroxyalkoxy, an amino moiety of the formula:

morpholino or piperidino. R'' and R''' in the foregoing individually represent either hydrogen, lower hydroxyalkyl, lower alkyl, allyl, phenyl, carboxyphenyl, sulfophenyl, chlorophenyl, lower alkoxyphenyl, lower sulfoalkyl, lower carboxyalkyl or tris(hydroxymethyl)methyl. In preferred compounds, at least one of the R'' and R''' symbols is not hydrogen.

Compounds of Formula I can be prepared from the known compound, 1-amino-4-cyano-2-naphthol, and preparation of said compounds from this starting material is another aspect of the present invention. In accordance therewith, 1-amino-4-cyano-2-naphthol is reacted with a 4-nitrobenzoyl halide (e.g., chloride or bromide) in an organic base (e.g., pyridine, dimethylaniline or acetone with bicarbonate in suspension) to give the compound, 1-(4-nitrobenzamido)-4-cyano-2-naphthol, which is then cyclized by fusion to 2-(4-nitrophenyl)-5-cyanonaphth[1,2-d]oxazole. The latter is reduced to the corresponding 4-amino derivative of the formula:

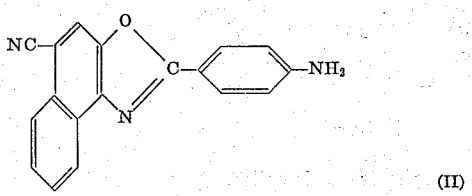

This intermediate is a new compound and forms another aspect of the present invention. Suitable reducing agents for the preparation of the compound of Formula II are sodium hydrosulfide, sodium hydrosulfite, hydrogen over Pd—C, iron and water, tin and hydrochloric acid, and magnesium and hydrochloric acid.

The compound of Formula II is condensed with a triazine having at least one halogen substituent (i.e., chlorine and bromine). If the triazine compound is cyanuric halide, the reaction gives the compound of the formula:

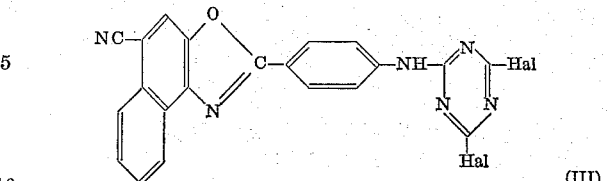

The condensation reaction for the preparation of the compound of Formula III is conducted at lowered temperatures (e.g., in the range of −10° to +10° C.), in an organic solvent such as acetone, dioxane or tetrahydrofuran. The reaction mixture should also include a basic material such as sodium hydroxide, sodium carbonate or sodium bicarbonate to take up the hydrogen halide liberated by the reaction. The resulting triazinyl derivatives (compounds of Formula III) are new compounds which form another aspect of the present invention.

Compounds of Formula III are treated in two steps to displace the halo radicals on the triazinyl moiety with groups corresponding to R and R' as defined above. In the first step, about a mole of an amine, alcohol, mercaptan, phenol, thiophenol, etc. (i.e., a reagent corresponding to R and R' and listed below) is added to the dihalo triazine in an organic solvent at a reduced temperature of 30–50° C. Under these conditions, only one halogen radical is displaced from the triazinyl moiety.

The displacement of the remaining halogen radical from the triazinyl moiety is effected by bringing the monohalo triazinyl derivative into reactive contact with another mole of the reagent corresponding to the radicals R and R' at an elevated temperature, e.g., a temperature between 70° C. and 100° C. The product from this latter displacement reaction is the desired compound corresponding to Formula I.

Suitable reagents for the displacement reactions described above are:

A. Amines corresponding to the formula:

wherein R'' and R''' are as above defined, examples of which are ammonia, allylamine, ethanolamine, isopropylamine, dihydroxypropylamine, aniline, p-chloroaniline, p-anisidine, orthanilic acid, metanilic acid, sulfanilic acid, chlorotoluidine, p-aminobenzoic acid, N-methyl taurine, N-methyl glycine, glycine, taurine, α-aminobutyric acid, N-methyl aniline, diethanolamine, diisopropylamine, N-ethylethanolamine, tris(hydroxymethyl)methylamine, piperidine and morpholine.

B. Alcohols such as methanol, ethanol, isopropanol, allyl alcohol, glycerol and glycol.

C. Mercaptans such as those corresponding to the alcohols of B.

D. Phenols or thiophenols.

The final products of this invention as provided above, have affinity for substrates such as cellulose, nylon, wool, polystyrene, polymethacrylates, polyvinylchlorides and other materials employed in the preparation of fibers and coating and molding compositions. When applied on, or incorporated in these substrates, they cause the same to exhibit a desirable red-shade-of-blue fluorescence, thus imparting to the substrate, an appearance of whiteness and brightness.

As a class, the cyanonaphthoxazoles of this invention are characterized by superior fastness against the destructive action of hypochlorite bleaches. They can be applied to the substrates during a manufacturing stage, e.g., fiber formation or resin compounding, or to a shaped product, e.g., a fiber or a coating, from a detergent bath. For application from such detergent baths, such groups as lower hydroxyalkylamino and alkoxyalkylamino in the positions of R and R' are suitable since they promote the dispersion of the compound in the bath, thereby leading to more uniform application onto the substrate to be brightened.

The following examples are presented to illustrate more fully this invention.

EXAMPLE 1

A. *Preparation of 2-(4-nitrophenyl)-5-cyanonaphth [1,2-d]oxazole*

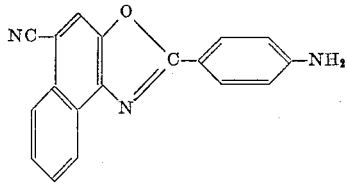

To 400 ml. of pyridine is added 36.8 grams of 1-amino-4-cyano-2-naphthol prepared by the method of J. Chem. Soc. 1934, 1485. Upon dissolution, 37.2 grams of 4-nitrobenzoyl chloride are added. The mixture is heated by boiling and allowed to cool. The amide product is precipitated by dilution with water. It is collected, washed with water and slurried in dilute hydrochloric acid. It is collected, dried and then fused with 25 grams of boric acid at 250° C. The mass is cooled and poured into 600 ml. of hot methoxyethanol from which it crystallizes on cooling. The nitro oxazole product is collected and washed with methanol. It is recrystallized, with the aid of activated charcoal, from a mixture of 400 ml. of dimethylformamide and 200 ml. of methoxyethanol.

B. *Reduction of 2-(4-aminophenyl)-5-cyano-naphth[1,2-d]oxazole*

To one liter of methoxyethanol and 400 ml. of alcohol is added 22.19 grams of the nitro compound prepared in (A), above. The temperature is raised to 85–95° C. A solution of 21 grams of sodium hydrosulfide in 50 ml. of water is added until there is an excess. The solution is treated with activated charcoal, filtered and the filtrate cooled. Water is added to precipitate the amino product. The product is collected, washed with water and dried at 40° C. in vacuo. It is recrystallized from monochlorobenzene to give a product, melting point 272–276° C.

EXAMPLE 2

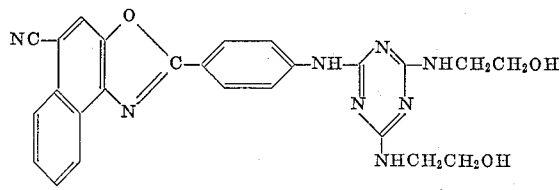

To 1.42 grams of the product of Example 1B in 125 ml. of acetone at 0–3° C. is added a solution of 0.97 gram of cyanuric chloride dissolved in 50 ml. of acetone. 1 ml. of 5 N sodium hydroxide solution and 25 ml. of water is added. 1.28 grams of monoethanolamine is added gradually. When the reaction is complete, the acetone is distilled off and replaced by methoxyethanol. The mixture is refluxed at 100° C. for 7.5 hours. The product is collected and washed with methoxyethanol. It is then recrystallized from a large volume of methoxyethanol to give a product, melting point 268.5° C. (dec.).

When applied to cotton, resin treated cotton, nylon and acetate, this compound shows good fluorescence and brightening effect. Its hypochlorite stability is excellent.

In the above example, 1.28 g. of monoethanolamine may be replaced by 1.78 g. of piperidine to give the bis-piperidino compound.

Replacement of the monoethanolamine by 1.15 g. of allylamine gives the bis-allylamino analogue.

Replacement of the monoethanolamine with 2.54 g. of trimethylolmethylamine gives the trimethylolmethylamino analogue.

EXAMPLE 3

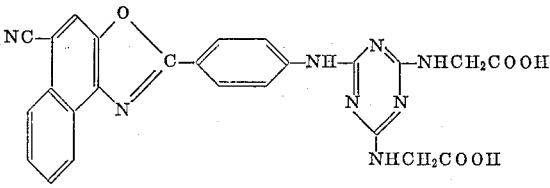

To 2.0 grams of the amine of Example 1 in 175 ml. of acetone, cooled to 0° C. is added a solution of 1.37 grams of cyanuric chloride in 50 ml. of acetone, keeping the temperature 0–5° C. Then 1.4 ml. of 5 N sodium hydroxide solution in 25 ml. of water is added. When the reaction is complete, a solution obtained by mixing 1.05 grams of glycine, 10 ml. of water and 2.8 ml. of 5 N sodium hydroxide solution, is added. The mixture is heated slowly to 50° C. and stirred about an hour at 50° C. It is then heated to 100° C. There is added 1.4 ml. of 5 N sodium hydroxide solution in 25 ml. of water. As the reaction proceeds, another addition is made of 1.4 ml. of 5 N sodium hydroxide in 25 ml. of water. When the reaction is complete, the mixture is cooled to room temperature and the product collected and washed with alcohol. The product is recrystallized from methoxyethanol with the aid of activated charcoal, washed with methanol, then water and dried at 55° C., melting point 314° C. (dec.).

This product has excellent fluorescence and brightening effect on cotton. Hypochlorite fastness is excellent.

The p-carboxyphenylamino analogue is prepared by substituting 1.92 g. of p-aminobenzoic acid for 1.05 g. of glycine.

The mixed carboxyphenylamino-carboxymethylamino analogue is prepared by cutting these quantities in half, adding the carboxyphenylamine first, heating one hour at 50° C., then adding the glycine.

EXAMPLE 4

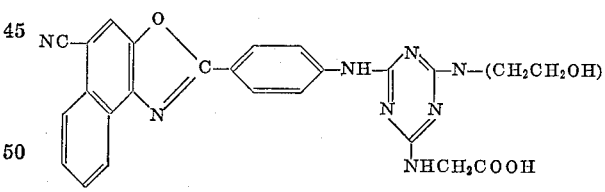

To 2.0 grams of the amine of Example 1 in 175 ml. of acetone, cooled to 0° C., is added a solution of 1.29 grams of cyanuric chloride in 50 ml. of acetone, keeping the temperature at 0–5° C. After stirring for an hour, 1.4 ml. of 5 N sodium hydroxide solution in 25 cc. of water is added. After 15 minutes, there is added a mixture of 0.53 gram of glycine, 10 ml. of water and 1.4 ml. 5 N sodium hydroxide solution. The whole is heated to 50° C. and stirred at this temperature for several hours. 1.47 grams of diethanolamine in 10 ml. water is added and the mixture is heated to 100° C. Upon evaporation of the acetone, methoxyethanol is added in its place and the whole heated at 100° C. for two hours. Upon cooling and acidification, the product precipitates. It is collected, washed with water and dried at 55° C. It is purified by dissolving in methoxyethanol with the aid of water and inorganic base, treated with activated charcoal, filtered, treated with acid, cooled, collected and washed. The product melts at 271° C. (dec.).

This product shows excellent fluorescence and brightening on cotton and resin-treated cotton. It brightens nylon if applied from an acid bath. Hypochlorite fastness is excellent.

Alternately, a solution of 0.53 g. of glycine in 10 ml. of water and 1.4 ml. of 5 N sodium hydroxide is added to a solution of 1.29 g. of cyanuric chloride in 50 ml. of acetone at 0–5° C. When the reaction is complete, 1.4 ml. more of 5 N sodium hydroxide is added. A solution of 2.00 g. of the amine from Example 1 in 175 ml. of acetone is now stirred to the mixture, and the whole is heated at 50° C. until free amine has disappeared. The third step is carried out with diethanolamine as described in the previous example.

Alternate to Step 2 in the preceding example, 0.74 g. of diethanolamine is added in place of the solution of the amine from Example 1, which is then added after heating at 50° C. for one hour. The reaction is carried to completion as previously described.

EXAMPLE 5

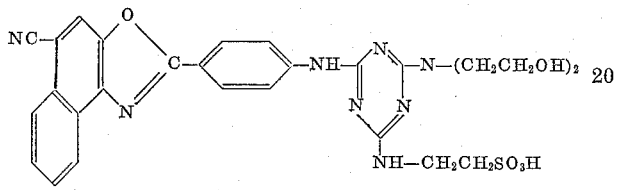

To 2.0 grams of the amine of Example 1 in 175 ml. of acetone, cooled to 0° C., is added a solution of 1.29 grams of cyanuric chloride in 50 ml. of acetone, keeping the temperature 0–5° C. After one hour, 1.4 ml. of 5 N sodium hydroxide in 25 ml. of water is added. 0.88 gram of taurine is dissolved in a minimum amount of water and added, followed by addition of 1.4 ml. of 5 N sodium hydroxide solution. The whole is heated at 50° C. for several hours. Another 1.4 ml. of 5 N sodium hydroxide solution is added, and the whole is stirred until the reaction is complete. There is added 1.47 grams of diethanolamine and the whole heated to 100° C. The acetone is evaporated and replaced with methoxyethanol and the whole stirred at 100° C. for two hours. The product precipitates on cooling and is collected, washed with alcohol and dried at 55° C. The product is further purified by salting out from methoxyethanol.

Alternately, the cyanuric chloride is first condensed with taurine, followed by the amine of Example 1, followed finally by a mole of diethanolamine. The order of reaction of the amine of Example 1 and diethanolamine is reversed.

This compound shows excellent fluorescence and brightening on cotton and resin-treated cotton. It brightens wool very well when applied from an acid bath. Hypochlorite stability is good.

EXAMPLE 6

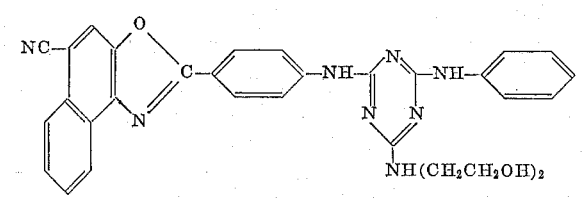

A solution of 2.85 grams of the compound of Example 1 in 125 ml. of acetone is cooled to 0° C. and 1.84 grams of cyanuric chloride dissolved in 50 ml. acetone is added, keeping the temperature 0–5° C. After stirring 45 minutes at 0–5° C., 2 ml. of 5 N sodium hydroxide solution and 50 ml. of water is added. When the reaction is complete, 0.93 gram of aniline in 10 ml. of acetone is added. The mixture is heated to 50° C. and maintained at this temperature for one and one-half hours. 2 ml. 5 N sodium hydroxide solution is added. When the reaction is complete, there is added 2.10 grams of diethanolamine. The temperature is raised to evaporate the acetone. Methoxyethanol is added and the whole heated at 100° C. until the reaction is complete (about an hour). Activated charcoal is added and the whole filtered. The filtrate is cooled and water added to precipitate the product. The product is collected, washed with alcohol and dried. On recrystallization from an aqueous methoxyethanol solution with the aid of activated charcoal, the product is obtained, melting point 240° C. (dec.).

When applied to cotton, nylon and resin-treated cotton, this product fluoresces on and brightens the fabric well. Its stability to hypochlorite is excellent.

If, in the above procedure, 1.23 g. of p-anisidine is substituted for 0.93 g. of aniline, the compound in which anilino is replaced by p-methoxyanilino is obtained.

Likewise, when anilino is replaced by 1.29 g. of a chloroaniline, the chloroanilino analogue is obtained.

EXAMPLE 7

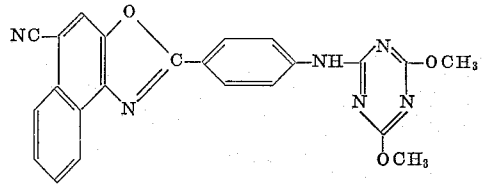

To 2.85 grams of the compound of Example 1 in 150 ml. of methoxyethanol is added 1.93 grams of 2-chloro-4,6-dimethoxy-s-triazine. The mixture is stirred at 100° C. until the reaction is complete. Sodium bicarbonate, 0.84 gram, is added, followed by a small amount of water. After further stirring, 150 ml. of water is added. The mixture is cooled and the product collected, washed and air-dried. Recrystallization from methoxyethanol gives a product melting above 300° C.

This compound shows fluorescence on and brightens cotton, nylon and acetate. It has excellent stability to hypochlorite.

In the above preparation, the replacement of 1.93 g. of 2-chloro-4,6-dimethoxy-s-triazine by 2.28 g. of 2-chloro-4,6-bis-methylmercapto-s-triazine, gives the bis-methylmercapto analogue of the above compound.

The allylmercapto analogue is prepared by using 2.85 g. of 2-chloro-4,6-bis-allylmercapto-s-triazine in place of the dimethoxy triazine.

EXAMPLE 8

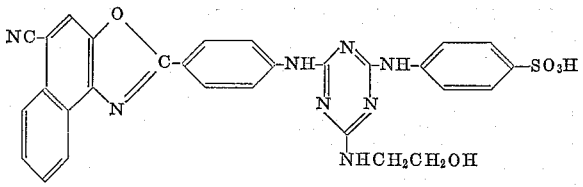

To 2.85 grams of the compound of Example 1 in 125 ml. of acetone at 0° C. is added 1.84 grams of cyanuric chloride in 50 ml. of acetone, keeping the temperature at 0–5° C. The whole is stirred 45 minutes at 0–5° C. and 2 ml. 5 N sodium hydroxide solution added, followed by 50 ml. of water. A solution of 1.73 grams of sulfanilic acid in 25 ml. water and 2 ml. 5 N sodium hydroxide solution is added. The reaction mixture is brought to 50° C. and stirred at this temperature for 2.5 hours. 2 ml of 5 N sodium hydroxide solution is added and the heating continued for a short time. Then 1.22 grams of monoethanolamine are added. The reaction mixture is brought to 100° C.; after evaporation of the acetone, equal parts of methoxyethanol and water are added. The reaction mixture is then heated at reflux. The water is evaporated; additional methoxythanol is added and the refluxing continued until the reaction is complete. The whole is cooled and the product collected, washed and dried.

This product brightens cotton and nylon and has excellent stability to hypochlorite.

Alternately, a solution of 1.73 g. of sulfanilic acid in 25 ml. of acetone, 50 ml. of water and 2 ml. of 5 N sodium hydroxide is prepared and a solution of 1.84 g. of cyanuric chloride in 50 ml. of acetone is added to it at 0–5° C. It is stirred until reaction is complete; 2 ml. of 5 N sodium hydroxide is added and then a solution of 2.85 g. of the amine of Example 1 in 125 ml. of acetone is poured in. The mixture is heated at 50° C. until free amine has disappeared; 2 ml. of the water is added, followed by 1.22 g. of monoethanolamine. The process is carried to completion as described above.

EXAMPLE 9

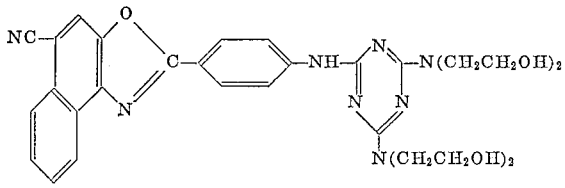

To 2.85 grams of the amine of Example 1 in 125 ml. of acetone, cooled to 0° C., is added 1.84 grams of cyanuric chloride in 50 ml. of acetone, keeping the temperature 0–5° C. After stirring for 45 minutes at 0° C., there is added 2 ml. of 5 N sodium hydroxide solution in 50 ml. of water. When the reaction is complete, 4.21 grams of diethanolamine are added. The whole is heated to 50° C. for an hour and then heated to 100° C. The acetone is replaced with methoxyethanol and the whole heated at reflux at 100° C. until the reaction is complete (about one and one-half hours). It is then cooled and the product collected, washed and dried. It is recrystallized from methoxyethanol to give a product melting at 283–286° C.

This compound has fluorescence on and brightens cotton and nylon. It has good stability to hypochlorite.

EXAMPLE 10

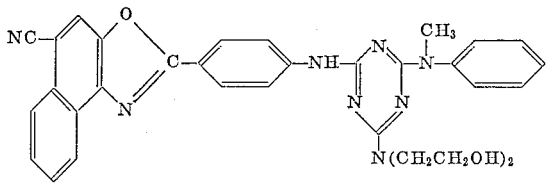

To 2.85 grams of the amine of Example 1 in 125 ml. of acetone at 0° C. is added 1.84 grams of cyanuric chloride in 50 ml. acetone, keeping the temperature 0–5° C. When the reaction is complete, 2 ml. of 5 N sodium hydroxide is added in 25 ml. of water. A solution of 1.07 grams of N-methylaniline in 50 ml. acetone is added and the mixture heated several hours at 50° C. Some methoxyethanol is added for solubility and the whole heated at 50° C. until the reaction is complete. A solution of 2.10 grams of diethanolamine in 20 ml. acetone is added and the whole heated at 100° C. until the reaction is complete (about three hours). It is cooled to 55° C., water added and, on further cooling, the product is isolated, washed and dried.

This compound brightens resin-treated cotton and nylon.

EXAMPLE 11

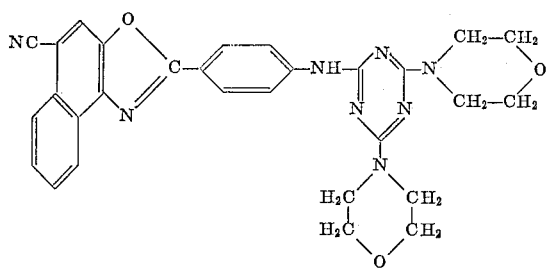

To 2.85 grams of the amine of Example 1 in 125 ml. of acetone at 0° C. is added a solution of 1.84 grams of cyanuric chloride in 50 ml. of acetone. The reaction is kept at 0° C. until complete. 2 ml. of 5 N sodium hydroxide solution in 50 ml. of water is added. Then 3.48 grams of morpholine is added and the temperature raised gradually to 50° C. and kept there until the reaction is complete. The acetone is then distilled off and replaced with methoxyethanol. The whole is refluxed at 100° C. for one and one-half hours. After cooling, the product is collected and recrystallized from methoxyethanol, collected, washed with alcohol and dried, melting point >305° C.

This compound shows fluorescence on and brightens cotton, nylon and acetate. It has excellent fastness to hypochlorite.

EXAMPLE 12

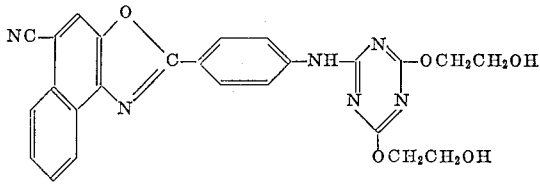

A solution of 2.85 g. of the compound of Example 1 in 125 ml. of acetone is cooled to 0° C., and 1.85 g. of cyanuric chloride in 50 ml. of acetone is added, keeping the temperature at 0–5° C. After stirring 45 minutes at 0–5° C., 2 ml. of 5 N sodium hydroxide solution and 50 ml. of water is added. When reaction is complete, the product, 5 - cyano - 2 - [p - (4,6-bis-chlorotriazinylamino) phenyl]-naphth[1,2-d]oxazole, is precipitated by adding water and isolated. The compound is then added to a solution of 0.46 g. of sodium metal in 50 ml. of ethylene glycol. The mixture is heated to 100° C. with stirring and maintained for three hours. After cooling, water is added, and the product is isolated by filtration.

In the above preparation, the 50 ml. of ethylene glycol may be replaced by 50 ml. of allyl alcohol to give the bis-allyloxy analogue.

EXAMPLE 13

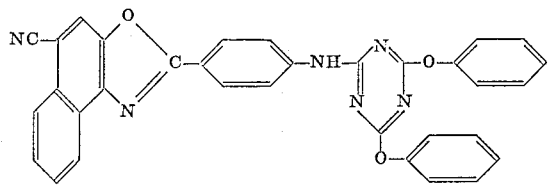

The dichloro triazinylamino derivative (cf., Example 12) is added to a solution of 0.02 mole of sodium phenolate in 100 ml. of methoxyethanol and heated at 50° C. for 1 hour. Then the temperature is raised to 100° C. for 2 hours, the mixture is cooled and diluted with water and finally the product is isolated by filtration.

In the foregoing, when 0.02 mole of sodium phenolate is replaced by 0.02 mole of sodium thiophenolate, the bis-phenylthio analogue is obtained.

EXAMPLE 14

One roll of a two-roll Thropp mill is steam-heated and 100 grams of poly(vinyl chloride) powder are placed in the nip. The roll is started and the poly(vinyl chloride) is banded. To the banded poly(vinyl chloride) is added 20 milligrams of the pure compound of Example 10. The mill is run until all of the compound is in the poly(vinyl chloride). The poly(vinyl chloride) band is then cut at every pass for 50 passes. The band is then transferred to a molding machine where under pressure, and at 300° F., a 20-mill sheet is molded.

A control sample of 100 grams of poly(vinyl chloride) without the compound is similarly run, cut and molded to form a 20-mill sheet.

After two weeks under daylight, the poly(vinyl chloride) sheet containing the compound of Example 10 is whiter than the control sheet of poly(vinyl chloride).

When the two sheets are observed under ultra-violet light, the sheet containing the compound of Example 10 has a bright blue fluorescence while the control sheet has no fluorescence.

The sheet containing the compound of Example 10 can withstand 100 hours of exposure to a fluorescent sunlamp without yellowing.

I claim:

1. A compound of the formula:

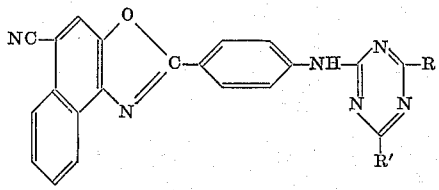

where R and R' are individually selected from the group consisting of lower alkoxy, lower alkylmercapto, allyloxy, allylmercapto, phenoxy, phenylmercapto, lower hydroxyalkoxy, lower dihydroxyalkoxy, morpholino, piperidino and an amino moiety of the formula:

wherein R'' and R''' individually represent a member selected from the group consisting of hydrogen, lower hydroxyalkyl, lower alkyl, allyl, phenyl, carboxyphenyl, sulfophenyl, chlorophenyl, lower alkoxyphenyl, lower sulfoalkyl, lower carboxyalkyl and tris(hydroxymethyl) methyl.

2. The compound of the formula:

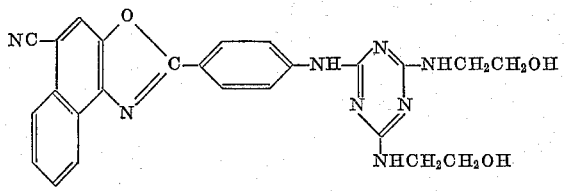

3. The compound of the formula:

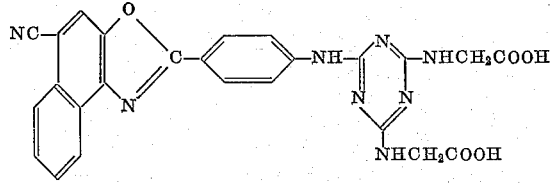

4. The compound of the formula:

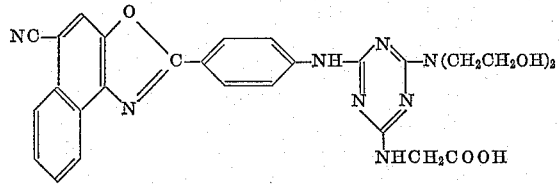

5. The compound of the formula:

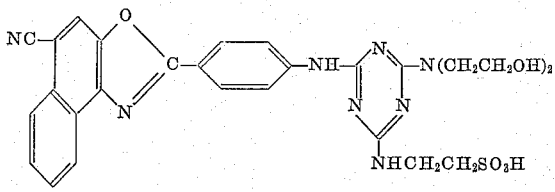

6. The compound of the formula:

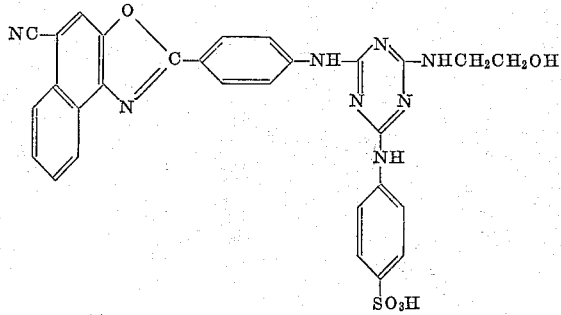

7. The compound of the formula:

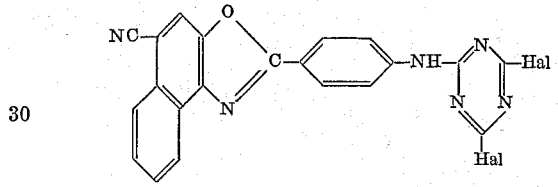

wherein each "Hal" symbol represents a halogen having an atomic weight between 34 and 81.

References Cited by the Examiner

UNITED STATES PATENTS

| | | | |
|---|---|---|---|
| 1,052,136 | 2/13 | Desamari et al. | 260—157 |
| 1,663,474 | 3/28 | Ackermann | 260—249 |
| 2,195,011 | 3/40 | Petitcolas et al. | 260—157 |
| 2,213,193 | 9/40 | Kirst | 260—157 |
| 2,334,348 | 11/43 | Miglarese | 260—307.4 |
| 2,804,458 | 8/57 | Wheeler et al. | 260—249.6 |
| 2,945,762 | 7/60 | Carroll et al. | 260—249.6 |
| 3,049,438 | 8/62 | Buell et al. | 260—249.9 |
| 3,055,896 | 9/62 | Boyle et al. | 260—249.5 |
| 3,058,989 | 10/62 | Buell et al. | 260—307.4 |
| 3,076,812 | 2/63 | Ackerman et al. | 260—307.4 |
| 3,095,422 | 6/63 | Duennenberger et al. | 206—307.4 |
| 3,120,520 | 2/64 | Buell | 260—240 |

FOREIGN PATENTS 165,102  2/04  Germany.

OTHER REFERENCES

Stephens et al.: "J. Chem. Soc.," 1949, pages 2971–2.

Elderfield: "Heterocyclic Compounds," vol. 5, publ. by John Wiley and Sons, New York, 1957, pp. 420–422.

Osman et al.: "J. of Org. Chem.," vol. 27, February 1962, pp. 558–561.

IRVING MARCUS, *Primary Examiner.*

NICHOLAS S. RIZZO, *Examiner.*